Nov. 5, 1963   M. G. VERRANDO, JR   3,109,809
WASH FILTER ELEMENT
Filed Jan. 4, 1960   2 Sheets-Sheet 1

INVENTOR.
MARCEL G. VERRANDO, JR.
BY
*Eyre, Mann & Lucas*
ATTORNEYS

3,109,809
WASH FILTER ELEMENT
Marcel G. Verrando, Jr., Glen Cove, N.Y., assignor to Pall Corporation, Glen Cove, N.Y., a corporation of New York
Filed Jan. 4, 1960, Ser. No. 223
5 Claims. (Cl. 210—130)

This invention relates to a wash filter element for fluid filtration at high flow rates and more particularly to a wash filter element so constructed as to have substantially uniform velocity and Reynolds numbers of minimum value in the wash fluid flow across the surface of the filter, and a controlled ratio of the pressure drop between the input flow and the filtrate flow through the filter to the pressure drop between the input and output flows across the filter element for optimum filtration characteristics.

In turbine engines such as are used in airplanes, it is necessary because of the high rate of consumption of fuel to circulate the fuel at extremely high flow rates. Such systems frequently require a supply of filtered fluid to operate the fuel control metering system. However, it is not necessary that the fuel going to the engine be filtered to the same particle size removal limit as that required by the metering system.

Under these flow conditions, it is impractical in the limited space available to interpose a filter element which is capable of filtering all of the fuel that is consumed, or even filtering that proportion of fuel required for the actuation of the control devices. Accordingly, filtering devices have been designed which can take off the proportion of filtered fuel needed to supply those parts requiring it, and pass the remainder to the engine. This type of filter is called a "wash filter" because the unfiltered fluid which passes over but not through the filter gives a wash action as it flows across the filter and can help to prevent clogging.

A typical problem is presented by the design of a wash filter for use with aircraft turbine fuels, such as grade JP-4 or JP-5 (MIL-J-5624D). Such filters must cope with flows ranging from 600 to 9,000 pounds per hour or higher, and must provide 98% removal of all particles larger than 10 microns at all flow conditions in this range from the fuel passing through the filter. Furthermore, the flow of filtered fuel must be within the range from 350 to 600 pounds per hour or higher, which means that a considerable proportion of the fuel must pass through the filter.

At such flow rates, the rate of removal of suspended material is so high that a filter can plug completely in a few seconds, if the wash action of the unfiltered fluid is inefficient. If the wash action is irregular, efficient in some areas but not in others, certain portions of the surface of the filter can plug, diminishing the flow of filtered fluid below the minimum that can be tolerated.

It is quite difficult to obtain a uniform and efficient wash action at every portion of the surface of a wash filter, because the loss of fluid through the filter introduces a pressure drop which increases gradually along the filter from the inlet towards the outlet of the wash flow passage. To maintain uniformity, this must be compensated for. The finer the removal rating of the filter, and the higher the flow rate, the more difficult this compensation is to achieve.

It has been determined, in accordance with the invention, that in order to operate a wash filter at high flow rates and a rigid true particle removal rating without plugging, it is necessary to maintain uniform wash flow velocity across the filter screen, a minimum Reynolds number in the wash flow of $5 \times 10^3$ and a lesser pressure drop in the wash flow than in the filtrate flow, with respect to input flow.

The wash filter element of the invention provides such compensation by supplying, in combination with the filter, a flow control screen placed downstream of the filter designed to a flow capacity to match the pressure drop in the filtrate flow to the input and output characteristics. The filter to some extent, of course, impedes filtrate flow, but the flow control screen has the sole function of matching pressure drop to flow requirements. In addition, the wash flow passage is so dimensioned as to maintain the wash flow requirements despite loss of filtered fluid through the filter.

The preferred filter comprises, in combination, a pair of smooth-surfaced screens, one having the function of a filter and the other having the function of filtrate flow control. These screens extend axially over a portion of an outer wall of the filter element. In the preferred embodiment, the filter is concentrically disposed within the flow control screen. The filter screen constitutes a wall of the wash flow passage. Thus, the wash flow washes the surface of the filter and prevents clogging.

The volume and physical configuration of the wash flow passage, and the flow capacity and physical configuration of the filter and flow control screen, are a function of the input, filtrate and output flow rate requirements. Wash filter elements in accordance with the invention are capable of operation under any low flow rate, but are particularly adapted to operate at high flow rates of from 600 to 9,000 pounds per hour, or higher, without clogging. However, for efficient and uniform wash flow it is necessary that the filter element design meet certain specifications in operation. These will now be discussed in detail.

First, it should be noted that the open area of the flow control screen and the volume of the annular wash flow passage must be such that for the fluid that is being filtered and under the flow conditions the magnitude of the pressure drop of unfiltered fluid across the length of the wash flow passage is less than that of filtered fluid through the filter. The pressure drop $\Delta p_1$ of filtered fluid through the filter is the difference between the inlet pressure $p_1$ and the outlet pressure $p_2$ on the filtered fluid side of the filter. Thus, $\Delta p_1 = p_1 - p_2$. The pressure drop $\Delta p_2$ of unfiltered fluid across the filter element is the difference between the inlet pressure $p_1$ of fluid entering the element and the fluid pressure $p_3$ of fluid on the downstream side of the filter element, at the far end of the wash flow passage. Thus, $\Delta p_2 = p_1 - p_3$. The terms "through the filter" and "across the filter element" are used throughout the specification and claims in the sense used herein.

$\Delta p_1$ is always greater numerically than $\Delta p_2$. For optimum operation at flow rates of 600 to 9000 pounds per hour, filtering up to 70% of the inflow, and a 10 micron removal rating, the ratio of $\Delta p_1$ to $\Delta p_2$ should be at least 2:1, and preferably is at least 10:1.

Dimensions of the wash flow passage required to give such ratios of $\Delta p_1 : \Delta p_2$ are readily calculated from standard pipe flow formulae and further details are not needed to instruct one skilled in the art as to this. The passage is diminished in volume towards the exit end thereof by decreasing its width, or its height, or both. It can, for example, be in the form of a truncated regular cone, or a truncated elliptical cone. A cylindrical passage defined by a filter tube can be diminished in volume by inserting a parabolic member diminishing its volume simply by taking up space and reducing the passage to an annulus adjacent the filter. The annulus may extend from a maximum of 360° to any smaller size, according to the filtrate and wash flow requirements.

The $\Delta p_1 : \Delta p_2$ ratio can also be obtained by adjusting the open area of the flow control screen, by limiting its open surface area or porosity.

Secondly, in addition to the minimum $\Delta p_1 : \Delta p_2$ ratio, a minimum value for the Reynolds number must be maintained for the wash flow. The Reynolds number must be at least $5 \times 10^3$, and preferably at least $1 \times 10^4$.

Thirdly, in conjunction with Reynolds number, a minimum velocity ratio of wash flow to filtrate flow must also be maintained. The wash flow velocity must be at least ten times greater than the velocity of the fluid through the pore openings in the filter, and preferably twenty times greater.

To design a filter element meeting these requirements, the familiar pipe flow formulae are used. A model can be prepared to confirm the accuracy of the calculations, but this is usually unnecessary. Starting from the input, output and filtrate flow requirements, which are known, determination of dimensions to meet these three parameters is simply a matter of mathematical calculation.

The actual size particle removed is the particle removal rating. It depends upon flow rate, pore diameter of the filter, and the fuel, and is determined readily by experiment for any filter.

It is important that the filter have a smooth surface. Any unevenness in the surface, such as is presented by a wire mesh cloth, sets up local turbulence and eddy currents around the pore openings, which interfere with the effective removal and with wash action. Any smooth surfaced sheet having holes or pores of the proper diameter to meet the particle removal rating can be used, and all are collectively referred to herein by the term "filter." The term "filter element" is reserved for the entire structure in which the filter is mounted.

A surface having the requisite smoothness can be obtained by rolling wire mesh screen to flatten the wires at the crossover points. It is also desirable when wire mesh is used to bond the wires at their points of crossing. A very satisfactory sintered mesh screen is described in U.S. Patent No. 2,925,650 and filters of this type are preferred for use in the instant invention.

Also useful are perforated metal plates having round, square, slotted, conical or venturi openings. A commercial form of such plates is "Electromesh," produced by electrodeposition.

The filter can be formed of any strong rigid material, impervious or resistant to attack by the fluid being filtered. Metal is most easily fabricated, and is preferred. Stainless steel is excellent for corrosion-resistance, but where corrosion is not a problem, other metals can be used, such as Monel metal, nickel, chromium-diffused nickel, chromium alloys, iron, copper, bronze and steel. Thermoplastic and thermosetting resins also can be used, such as phenol-formaldehyde polymers. These can be molded into the desired filter, and can include filters such as fibrous glass cloth for greater strength.

The flow control screen is designed to introduce the desired pressure drop $\Delta p_2$ through the wash filter to achieve the $\Delta p_1 : \Delta p_2$ ratio of at least 2:1 by limiting the open area available for filtrate flow. It can also serve as an outer shell to protect the filter.

The flow capacity of the flow control screen is adjusted to meet the filtrate flow requirements and maintain the proper $\Delta p_1 : \Delta p_2$ ratio. This means that the filter is reserved for maintaining the particle removal rating, and the flow control screen for maintaining pressure drop. Since these functions are not interdependent, having them performed by separate components greatly increases the versatility of filter elements of the invention.

The flow capacity of the flow control screen can be less than that of the filter, but does not exceed that of the filter, unless the filter takes over this function of limiting flow capacity. If only a part of the surface has to be used, any remaining openings in the flow control screen can be blocked off. This can be done, for example, by sealing the openings with a synthetic resin, such as an epoxy resin.

Any type of open screen can be used for flow control. Perforated metal sheets or plates are quite satisfactory, as also are any of the other materials suggested above for use as the filter. The smooth surface is also a prerequisite here. The openings are not of a filtering dimension, usually, although they can be.

The member limiting the volume of the wash flow passage, present in some of the filter elements of the invention, can be made of any sturdy material, such as those described above for use in preparing the filter. The configuration required for proper wash flow control without turbulence under the flow conditions is determined by calculation. The desired configuration is usually parabolic, best obtained by molding or casting in a mold, and this is best done with a casting metal or a moldable synthetic resin, preferably having structural rigidity, such as polystyrene or a urea-formaldehyde resin.

The member can be provided with a central or side passage incorporating a relief valve to cope with variations in input flow conditions. The dimensions of the relief valve passage, and the crack-open pressure at which the relief valve opens this line to bypass the filter, are determined by the input, filtrate and output flow requirements of the system. The relief valve for use in this way is conventional in construction, and any of those known to this art could be employed.

Several embodiments of filter elements in accordance with the invention are illustrated in the drawings.

For systems in which the maximum filtrate flow is not more than about 10% of the input volume, and the input rate is substantially constant, it is possible to use a very simple form of element. This basic form of the wash filter of the invention is composed of a pair of cylindrical curved screens, one, the filter, and the other, the flow control screen, with the filter constituting a wall of the wash flow passage. In the form shown in FIGURE 6, the filter screen is concentrically disposed within the flow control screen and enclosing the wash flow passage. This position could be reversed, if the wash flow passage were on the outside.

For systems in which the filtrate flow is from 10 to up to 70% of the input, and the input rate is substantially constant, it is necessary to diminish the flow capacity of the wash flow passage, preferably without diminishing filter surface area so as to maintain filtrate flow capacity and wash surface area. This can be done by inserting a flow-impeding member contoured to avoid turbulence of the flow and preferably having a parabolic shape. This converts the wash flow passage from a cylindrical passage as in FIGURE 6 into an annular passage spaced a relatively short distance from the filter screen. A typical filter element of this type is shown in FIGURE 7. The volume of open area of the wash flow passage and the flow capacity of the flow control screen are adjusted to fit the flow rate and the percentage of filtrate flow required.

The filter element of the invention gives uniform filtrate flow only when the ratio of $\Delta p_1 : \Delta p_2$ is relatively constant. If the input changes appreciably, this ratio can change, and with it filtrate flow characteristics, because of the difference in pressure drop through the flow control screen. Hence, it is necessary to control input, or arrange to adjust for it.

A filter element having the characteristic of adjusting to changes in input is designed to function at the minimum input pressure to be encountered, and is equipped with a relief valve or other type of bypass which operates at pressures beyond the minimum input pressure to ensure maintenance of this minimum in the filter element. Thus, if the input increases, the bypass line is opened so as to maintain the pressure drop through the filter constant despite the change in input. A filter element of this type is shown in FIGURES 1 to 4.

The filter element of FIGURES 1 to 4, has flow control screen 1 of perforated metal sheet, such as nickel "Electromesh," enclosing a two-layer filter composite of a coarse mesh wire filter screen 2 sinter-bonded to a sinter-bonded filter screen 3 prepared in accordance with Patent No. 2,925,650. Both the flow control screen and filter composite can be of stainless steel. The three layers are concentric, and are each formed by rolling sheet into a tube and welding the lapped over ends.

Figure 1:
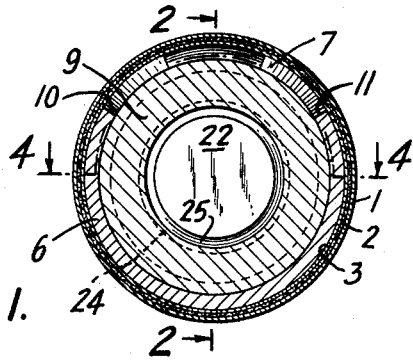
FIGURE 1 is a cross-sectional view of a cylindrical wash filter element in accordance with the invention, compensated for variations in input flow.
Figure 3:
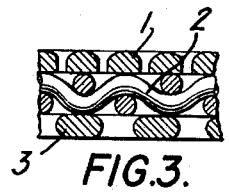
FIGURE 3 is a detailed view of the three layers composing the outer wall of the filter element of FIGURES 1 and 2.
Figure 2:
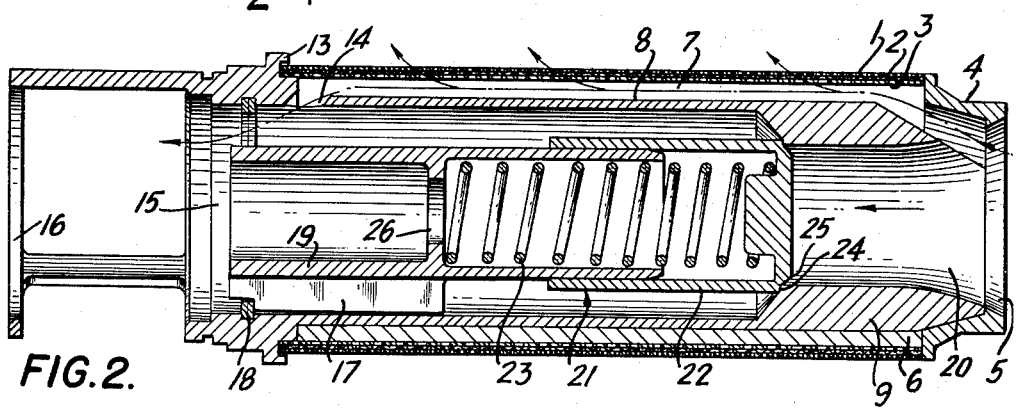
FIGURE 2 is an axial view in cross section, taken along the lines 2—2 of FIGURE 1.
Figure 4:
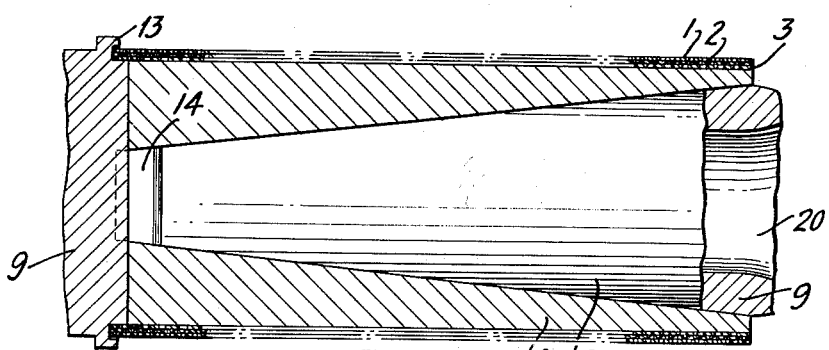
FIGURE 4 is an axial view, in cross section, of the annular passage of the filter element, taken along the lines 4—4 of FIGURE 1.

At the inflow end of the cylinder thus formed is bonded an insert 4 of aluminum or other material, which insert contains the inlet opening 5 of the filter element. The inner end of the insert 4 abuts against a partial cylindrical insert 6, also of aluminum, which contacts the filter 3 directly over the greater part of its length, and whose ends constitute the sides 10 and 11 of an axial passage 7 just below the filter 3. This insert reduces the wash flow passage 7 to the form of an annulus, directly below the filter 3. The inner wall 8 of this passage is formed by tubular insert 9, also of aluminum, which fits beneath the insert 6. The passage 7 decreases in width towards the exit 14 therefrom, as best shown in FIGURE 4.

The other end of the insert 9 projects beyond the insert 6 and the outer shell 1, and is provided with a flange 13, which fits over the shell. Insert 9 thus holds insert 6 firmly in position. There is a cut-out portion 14 in the insert for exit of fluid from the passage 7 into the outlet passage 15 of the insert.

A framework 16 for assistance in mounting the element in the system is machined as an extension to the insert 9. A spider 17 is held in place in the opening 15 by a retaining ring 18, and supports an inner tube 19 made of aluminum or other material and designed to support the relief valve assembly.

The insert 9 is provided with a central bypass passage 20 communicating with the inlet 5 and the outlet 15, and in this passage is fitted a relief valve assembly 21 of conventional construction, which is mounted at one end of the cylinder 19. The relief valve assembly is composed of a spring-mounted poppet 22, desirably made of aluminum. The spring 23 urges the poppet into sealing relationship against the seat 24 formed on a projecting portion of the inner wall of the insert 9. The end 25 of the poppet 22 can be shaped to fit snugly against the seat for a tight seal under the force of the spring 23. The base of the spring is mounted against a crosspiece 26 about midway down the cylinder 19. The relief valve assembly is readily removed for servicing by removing the retaining ring 18, which relases spider 17 and tube 19 with the assembly attached.

Figure 5:
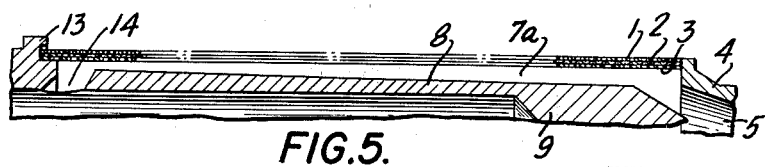
FIGURE 5 is an axial view, in cross section, of another form of annular passage which can be used in this filter element.

FIGURE 5 shows a filter element in which the annular wash flow passage 7a diminishes in height from entrance to exit at 14. The element otherwise is similar to FIGURE 2.

The input flow of unfiltered fluid enters the element at the inlet 5, and is deflected into the passage 7, whence a portion flows through the filter composite 2, 3 and the flow control screen 1 into the collection line. The remainder of the unfiltered fluid washes the surface of the filter 3 free from suspended matter removed thereby, emerges from the end 14 of the passage 7, and exits from the element at 15.

Whenever the input flow of unfiltered fluid increases beyond the minimum at which the filtrate flow is delivered, such that the pressure differential between the inlet 5 and the outlet 15 exceeds a predetermined value, the relief valve 21 opens the bypass 20 and supplements the flow of unfiltered fluid through the element. This prevents a change in the pressure at the filter 2, 3, which would change the pressure drop $\Delta p_2$ and therefore the filtrate flow. Thus, the latter is kept constant despite variation in input pressure. Liquid passing through the bypass 20 joins the unfiltered fluid emerging at 14 from the passage 7.

A filter element of the above design, when tested with fuel contaminated in accordance with military specification MIL–E–5007A and MIL–E–5007B, has a life of twenty hours minimum, and is capable of satisfactory operation at rates of input flow ranging from 600 to 9000 pounds per hour, under which conditions it will deliver a flow of from 350 to 600 pounds per hour of filtered fuel. The maximum pressure drop of flow across the filter is 15 p.s.i., and the maximum pressure drop through the filter is 30 p.s.i.

Figure 7:
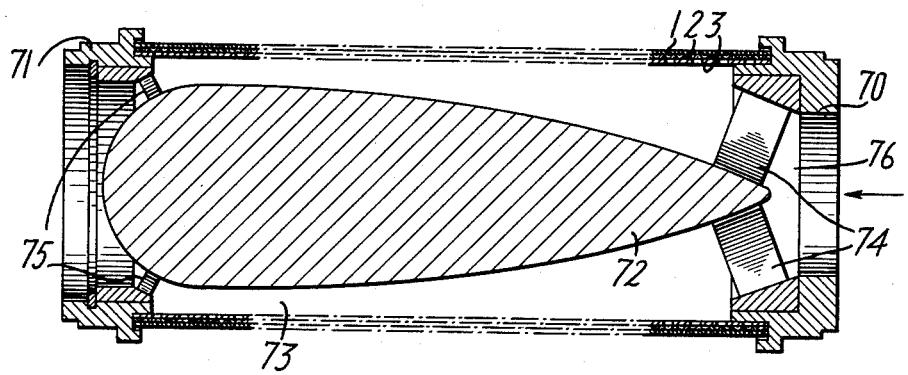
FIGURE 7 is an axial view in cross-section of another form of wash filter element in accordance with the invention, constituting the element of FIGURE 6 modified by inserting a parabolic bullet in the wash flow passage to increase the percentage of filtrate flow.

This filter element can be designed to operate at input flows from about 2400 to about 36,000 pounds per hour and at filtered flows of from about 1400 to about 2400 pounds per hour merely by making the wash flow passage 7 a 360° annulus, as in FIGURE 7. Intermediate annulus sizes give intermediate flow rates.

Figure 6:
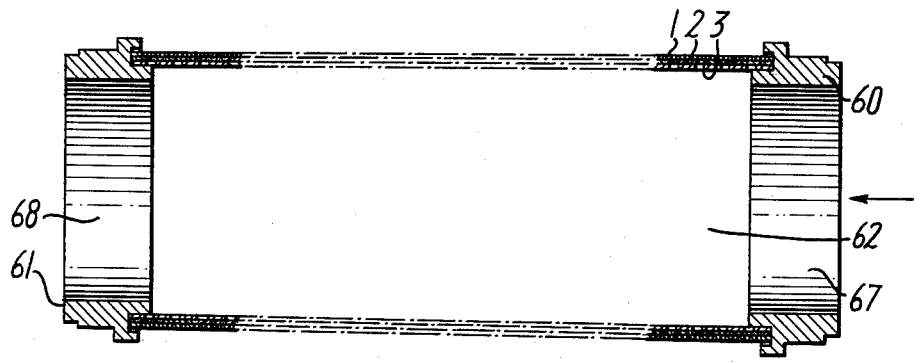
FIGURE 6 is an axial view in cross-section of a basic form of conical wash filter element in accordance with the invention.

A simple form of wash filter element in accordance with the invention in the form of a truncated cone which is adapted for use with high input flows of from 20,000 to 36,000 pounds per hour which vary only inappreciably, to produce up to from 2,000 to 3,600 pounds per hour filtrate flow, is shown in FIGURE 6. This filter element has an outer flow control sheet 1 of perforated metallic sheet, such as nickel "Electromesh," enclosing a layer of coarse wire mesh screen 2, sinter-bonded to a filter screen 3 prepared in accordance with Serial No. 562,127. These are made of stainless steel, and are concentric.

At the inflow and outflow ends of the cone, there are bonded inserts 60 and 61, which hold the screen tubes 1, 2, 3 in place, and which are adapted to attach the filter element in the system. The filter 3 encloses the central wash passage 62 of the element, which diminishes slightly (10% or less) in volume from the inlet 67 to the outlet 68.

In operation of this unit, the input flow of unfiltered fluid enters the element through the central passage 67 of the insert 61. A portion of the flow washing the surface of the filter 3 passes through the filter composite 2, 3, while the remainder washes the surface free from suspended matter removed by the filter, and emerges at the other end 68 of the wash flow passage 62 through the insert 61.

If it is necessary to increase the percentage of filtrate flow, it is desirable to put an insert in the center of the wash flow passage, so as to maintain the same wetted perimeter, while reducing the wash flow passage volume, rather than reduce the wetted perimeter by reducing wash flow passage volume. If the wetted perimeter is kept the same, the flow rate through the filter is also maintained. If the wetted perimeter is reduced, then the filter surface area has to be increased by increasing length of the unit, to get the desired increase in filtrate flow. A typical element of this type is shown in FIGURE 7. This element, it will be noted, has substantially the same external construction as that of FIGURE 6, but is cylindrical rather than conical because the reduction in volume of the wash flow passage is now accomplished by a bullet in the passage. Inserts 70 and 71 press-fit into the end of the perforated metal sheet 1, the coarse wire mesh screen 2, and the sinter-bonded filter 3 support the structure. A parabolic bullet 72 of the same material as the remainder of the filter is supported in the wash flow passage 73 through the spiders 74 and 75 reducing the passage to an annulus directly below the filter 3.

In operation, the input flow of unfiltered fluid enters the element at the inlet 76, and is deflected by the bullet 72 into the annular wash flow passage 73, whence a portion flows through the filter composite 2, 3, and into the filtrate collection line. The remainder of the unfiltered fluid washes the surface of the filter 3 free from suspended matter, emerges from the end of the passage 73, and exits from the element through the spider 75. This type of construction is designed for filtrate flows ranging up to about 70% of the input.

It will be appreciated that numerous modifications can be made in the filter elements of the invention. The filter, especially when cylindrical in shape, can be rotatably mounted within the flow control screen and adapted to rotate freely under the force of fluid flowing through the filter, or forced to rotate by motorization. The rotation of the filter introduces a further refinement in the wash action and in the particle removal rating of the filter. A return flow of filtered fluid to the unfiltered fluid line may be necessary to prevent the filter from acting as a full flow filter, in which all of the fluid passes through the element across the filter, and none through the filter itself.

It is not essential, of course, that the filter and flow control screen be cylindrical. Any shape, such as flat, polygonal, elliptical, or other regular or irregular configurations, can be used. The cylindrical configuration is shown as illustrative because it is the most efficient, and the easiest to construct.

I claim:

1. A cylindrical wash filter element for high flow rate fluid filtration having efficient wash flow action to minimize plugging, comprising an outer flow control cylinder of perforated sheet metal enclosing a smooth-surfaced concentric cylindrical filter composite of wire mesh bonded to a sinter-bonded wire mesh, a concentric cylindrical flow-reducing insert member enclosed by the filter, the filter inner wall and insert defining therebetween an annular wash flow passage having a width ranging from 360° to a segment of the volume enclosed by the filter, and variable in volume, being greatest in volume at its inlet and diminishing uniformly in volume to the outlet, a central passage in the insert member, a relief valve disposed across the central passage, and adapted to open at a predetermined pressure differential across said passage, inlet and outlet passages communicating with the ends of the wash flow passage and the central passage, both said passages being intended for flow of unfiltered fluid, the wash flow passage being so dimensioned, and the flow control cylinder having an open area such that the ratio of the pressure differential $\Delta p_1$ through the filter element to the pressure differential $\Delta p_2$ across the filter $\Delta p_1:\Delta p_2$ is at least 2:1 and the Reynolds number in the wash flow is at least $5 \times 10^3$ at a velocity at least ten times greater than the velocity of the filtrate flow, and the relief valve being adapted to maintain the ratio at input flow beyond a predetermined minimum flow rate.

2. A cylindrical wash filter element in accordance with claim 1 in which the perforated sheet and filter are made of stainless steel.

3. A cylindrical wash filter element for high flow rate fluid filtration having efficient wash flow action to minimize plugging, comprising an outer flow control cylinder screen enclosing a smooth-surfaced concentric cylindrical filter of sinter-bonded wire mesh, a concentric cylindrical flow reducing insert member enclosed by the filter, the filter inner wall and insert defining therebetween an annular wash flow passage which is greatest in volume at its inlet and diminished uniformly in volume to the outlet, a central passage in the insert member, a relief valve disposed across the central passage and adapted to open at a predetermined pressure differential across said passage, inlet and outlet passages communicating with the ends of the wash flow passage and the central passage, both said passages being intended for flow of unfiltered fluid, the wash flow passage being so dimensioned and the flow control cylinder having an open area such, that the ratio of the pressure differential $\Delta p_1$ through the filter to the pressure differential $\Delta p_2$ across the filter $\Delta p_1:\Delta p_2$ is at least 2:1, and the relief valve being adapted to maintain the ratio at input flow beyond a predetermined minimum flow rate.

4. A cylindrical wash filter element in accordance with claim 3 in which the flow control screen in a perforated sheet in which the perforations are blocked in a number sufficient to reduce the flow capacity to maintain the $\Delta p_1:\Delta p_2$ ratio.

5. A cylindrical wash filter element in accordance with claim 3 in which the flow control screen and the filter are made of stainless steel.

References Cited in the file of this patent

UNITED STATES PATENTS

| | | |
|---|---|---|
| 671,003 | Ruthenburg | Apr. 2, 1901 |
| 1,896,655 | Zerzow | Feb. 7, 1933 |
| 2,047,793 | McKinley | July 14, 1936 |
| 2,352,732 | Nugent | July 4, 1944 |
| 2,750,042 | Wilkinson | June 12, 1956 |
| 2,927,451 | Bochan | Mar. 8, 1960 |
| 2,985,306 | Statzell | May 23, 1961 |

FOREIGN PATENTS

| | | |
|---|---|---|
| 95,799 | Switzerland | Aug. 1, 1922 |